June 16, 1936. J. M. HOTHERSALL Re. 20,009

ART OF DRAWING

Original Filed Feb. 20, 1931 4 Sheets-Sheet 1

INVENTOR
John M. Hothersall
BY
John C. Carpenter
ATTORNEY

June 16, 1936. J. M. HOTHERSALL Re. 20,009

ART OF DRAWING

Original Filed Feb. 20, 1931 4 Sheets-Sheet 2

INVENTOR
BY John M. Hothersall
John C. Carpenter
ATTORNEY

June 16, 1936. J. M. HOTHERSALL Re. 20,009

ART OF DRAWING

Original Filed Feb. 20, 1931 4 Sheets-Sheet 3

INVENTOR
BY John M. Hothersall
John C. Carpenter
ATTORNEY

June 16, 1936. J. M. HOTHERSALL Re. 20,009

ART OF DRAWING

Original Filed Feb. 20, 1931 4 Sheets-Sheet 4

INVENTOR
BY John M. Hothersall
John C. Carpenter
ATTORNEY

Reissued June 16, 1936

Re. 20,009

UNITED STATES PATENT OFFICE 20,009

ART OF DRAWING

John M. Hothersall, Brooklyn, N. Y., assignor to American Can Company, New York, N. Y., a corporation of New Jersey Original No. 1,967,245, dated July 24, 1934, Serial No. 517,244, February 20, 1931. Application for reissue April 13, 1936, Serial No. 74,393

28 Claims. (Cl. 113—46)

The present invention relates to drawing presses and has particular reference to a self-contained compensating and self-acting drawing and clamping device for shaping and holding the material being operated upon in all of its drawing stages.

The present invention is directed to an improved method and apparatus for compensating or balancing the amount of clamping action effective upon the material in a series of slip grips in which the metal is held during each stage of drawing, this clamping force being automatically adjusted, at every stage of action, in direct ratio to the drawing resistance of the material being acted upon. A similar principle of clamping action as applied to a single drawing operation is disclosed in my pending application filed in the United States Patent Office, May 16, 1930, as Serial No. 452,852.

The present invention relates to a series of drawing operations, the working forces of each stage being automatically controlled and applied in a unified compensating and balancing action.

The principal object of the present invention is the provision of a method and mechanism for performing a series of drawing operations upon sheet material while preventing the formation of wrinkles by holding the work during each of the drawing actions in a slip grip having compensated clamping strength.

An important object of the invention is the provision of a method and mechanism adapted to uniformly draw an article from sheet material in a series of stages by properly holding the same in a varying, self-compensating clamping action at the different stages, these clamping actions being dependent in degree upon the resistance of the material being drawn.

An important object of the invention is the provision of a mechanism adapted to uniformly draw an article from sheet material in a series of steps or stages by utilizing a clamping device at each stage which automatically adjusts itself to the proper degree of clamping action to prevent development of wrinkles in the material.

An important object of the invention is the provision of inter-acting elements hydraulically connected to perform a series of self-adjusting clamping actions in a series of drawing operations.

An important object of the invention is the provision of a die mechanism for holding sheet material in a series of slip grips while successively drawing the same over shaping members, the degree of clamping action in the slip grips varying directly with the force required in the drawing operations.

An important object of the present invention is the provision of a drawing mechanism wherein a single operating movement in one direction is transmitted through a liquid to parts of the mechanism to effect a corresponding series of resulting movements in the opposite direction.

An important object of the invention is the provision of a press mechanism for forming a drawn article in a series of operations by first cutting a disc from sheet material and then successively holding the same in equalized slip grips while successively drawing into shape.

Numerous other objects of the invention will be apparent as it is better understood from the following description, which, taken in connection with the accompanying drawings, discloses a preferred embodiment thereof.

Referring to the drawings.

Figure 1:
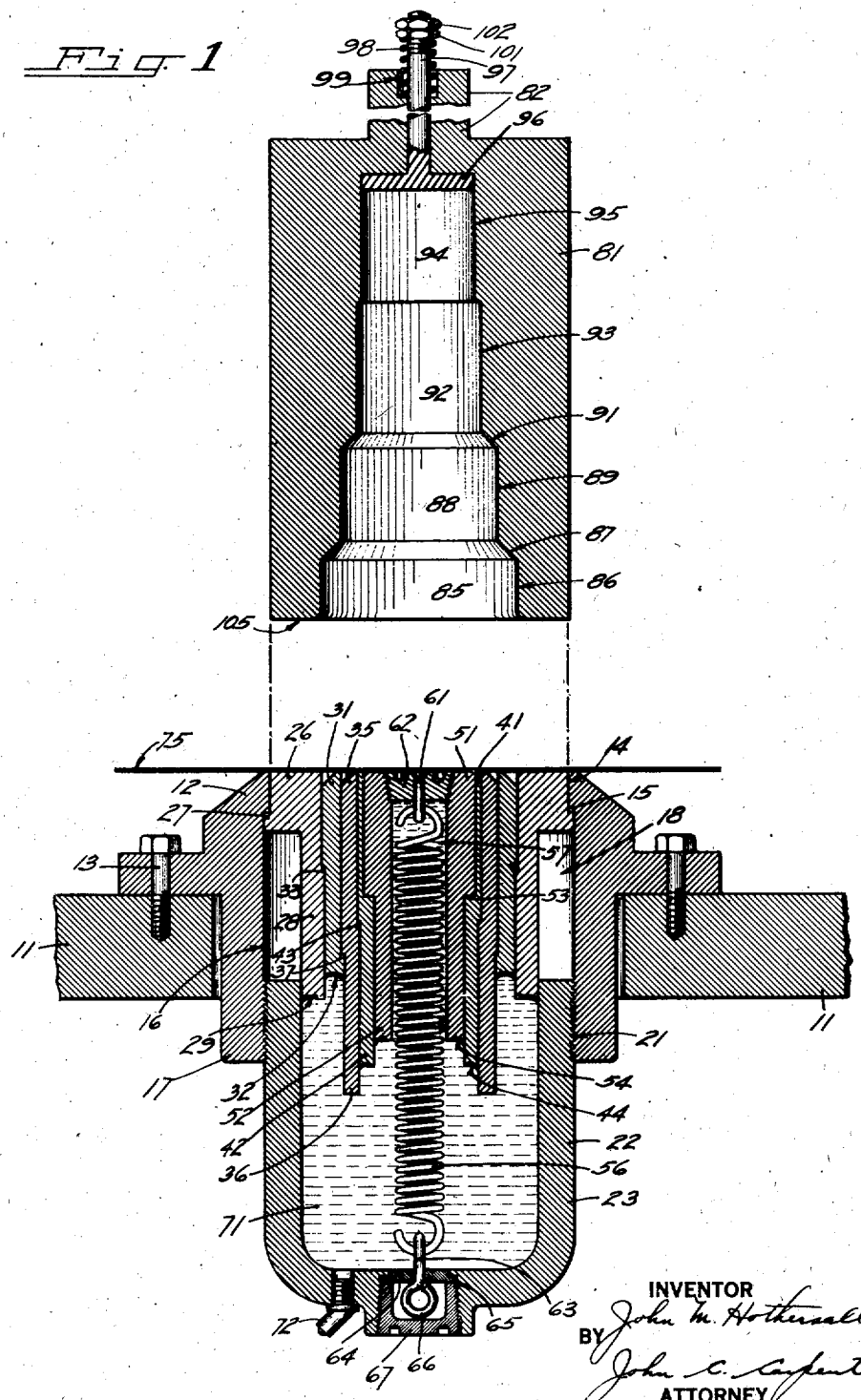
Figure 1 is a longitudinal sectional view through a cutting and drawing punch and die mechanism embodying the present invention, the view illustrating the parts in position prior to operation.

The drawing press mechanism illustrated as a preferred embodiment of the present invention is carried in a suitable press frame in the usual manner. Those parts which are concerned particularly with the present invention comprise upper movable punch members and lower die members. The die member parts are supported on a bolster plate 11 (Figs. 1 and 6) and comprise a cutedge member 12 secured to the bolster plate by bolts 13.

This cutedge member is provided with an annular cutting edge 14, the wall of which is undercut to provide a shoulder 15 which forms a termination for a vertical wall 16, extending downwardly in a tubular section 17 which encloses a chamber 18. The lower part of the tubular wall 17 is threaded at 21 to provide engagement with the upper end of a cylindrical wall 22 of a cup or bowl member 23.

A draw ring 26 is located for sliding movement within the cutting wall 14 of the cutedge 12 and is provided with an annular projecting shoulder 27 which engages beneath the shoulder 15 of the cutedge 12 when the draw ring is in its uppermost position. The ring 26 has a downwardly extending tubular section 28 which slidingly engages inside of the inner part of the cup member 23 adjacent its upper end and this joint is rendered liquid-tight by the use of a cup washer 29 seated in a groove formed on the bottom face of the wall 28.

A second tubular ring 31 is provided, being located interior of and having sliding movement within the draw ring 26, the sliding joint so formed being rendered liquid-tight by a washer 32 carried on the lower end of the tubular wall of the ring 31. The ring 31, when in its lowermost position (Fig. 1) engages a stop shoulder 33 formed in the wall 28 of the draw ring 26, the upper part of the ring 31 being of a larger diameter, as illustrated, to insure such engagement.

A third tubular ring 35 is used, being located for sliding movement within the ring 31, its outer wall being of larger diameter above than a lower tubular wall 36. The juncture between these two outside diameters provides a stop for a shoulder 37 formed on the inside of the ring 31 and insures a definite relation of the rings 31, 35 when the latter is in its lowermost position.

A fourth ring 41 is provided, being located inside of the ring 35 and extending downwardly in a tubular wall 42, the outer diameter of which is less than the outer diameter of the upper part of the ring, this construction providing a stop for engagement with a shoulder 43 formed in the ring 35 when the ring 41 is in its lowermost position, (Fig. 1). The ring 41 has sliding movement in the ring 35 and a liquid-tight sliding joint is provided by a cup washer 44 inserted in an annular groove formed on the lower end of the tubular extension 42 of the ring 41.

An anvil block 51 is located and has sliding movement within the ring 41 and is formed with a downwardly extending part 52, the outer diameter of which is less than the outer diameter of the upper part of the block. The junction between the diameters provides a stop for engagement with a shoulder 53 formed in the part 42 of the ring 41 when the anvil block is in its normal or lowermost position, as shown in Fig. 1. A liquid-tight sliding joint is maintained therebetween by a cup washer 54 carried on the lower surface of the extension 52.

The anvil block 51 and its surrounding rings, 41, 35, 31, 26, are held in a normal or lowered position by a spring 56 located within a central vertical bore 57 formed in the anvil block 51, the lower part of the spring extending downwardly within the cup member 23. The upper end of the spring is engaged by an eye 61 carried in a screw plug 62 threadedly engaged in the upper end of the anvil block 51, this plug closing the upper end of the bore 57.

The lower end of the spring is engaged in similar manner in an eye 63 passing through a shouldered washer 64 seated within an opening 65 formed in the bottom wall of the bowl 23. The eye 63 extends through the washer 64 and merges into a second eye 66 on the outside of the washer. This construction allows easy assembly of the lower die elements.

In this assembling the spring 56 must be located after the other parts are properly placed in their nested positions (Fig. 1), the plug 62 at that time, with the spring 56 hanging from its eye 61, being threaded in position within the upper end of the anvil block 51. The lower end of the spring is thereupon engaged by a wire or cord and is stretched outside of and pulled beyond the bottom wall of the cup member. The eye 63, assembled with the washer 64, is then hooked over the lower end of the spring 56 and the spring is allowed to retract until the washer 64 is seated within its counterbore 65. The eye 66 provides a hold or handle to allow this seating action.

The washer and its parts are then sealed by a screw plug 67 threadedly secured into the bottom wall of the bowl 23.

Figure 6:
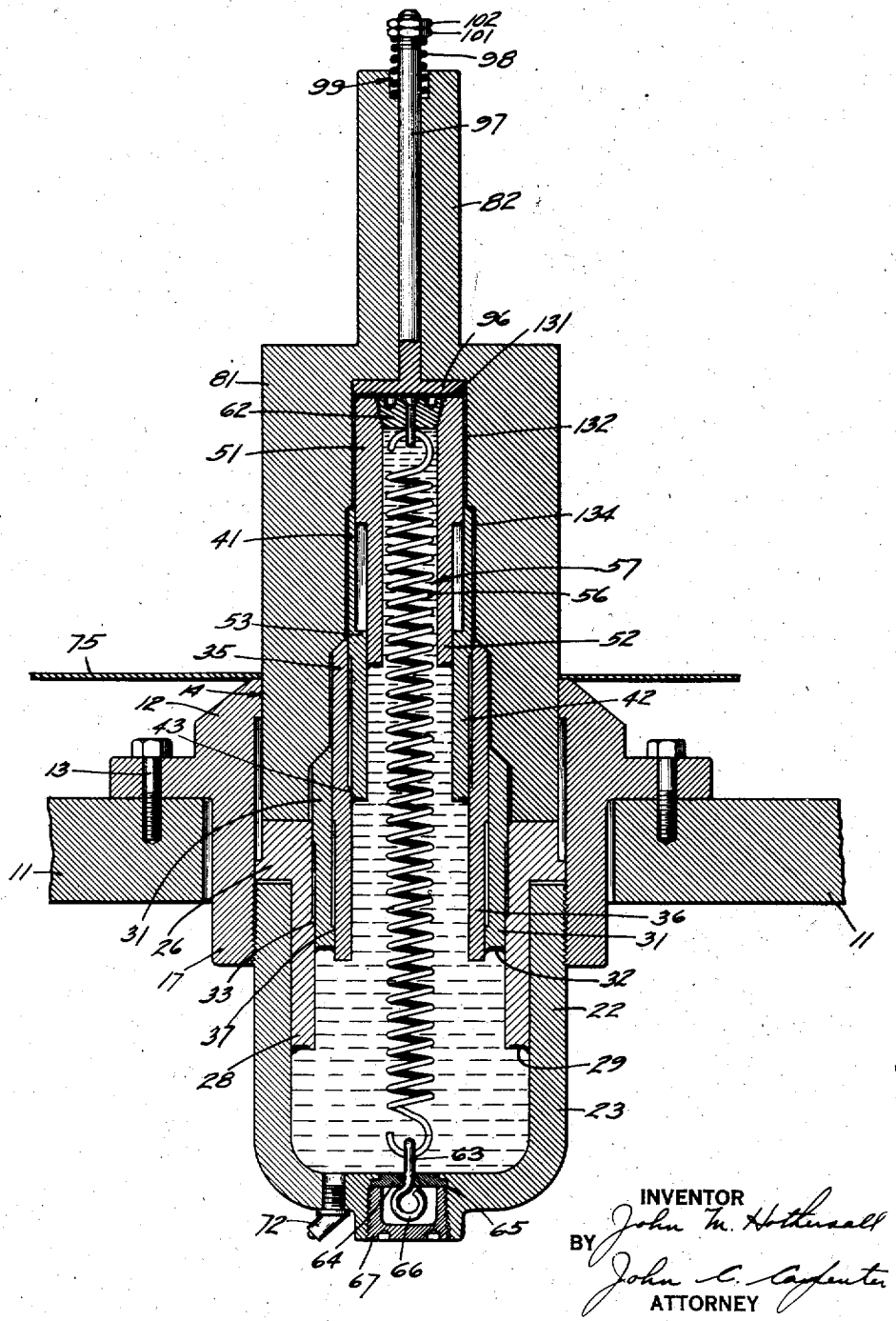
Figure 6 is a view similar to Fig. 1 showing the position of the parts at the end of the final drawing operation.

A liquid, designated by the numeral 71, which may be oil, glycerine, or the like, is contained within the bowl 23 (Figs. 1 and 6). A sufficient quantity of liquid is used to completely fill the chamber below the lower ends of the anvil block and the surrounding rings. The vertical bore 57 of the anvil block is also completely filled with liquid.

This liquid may be conveniently inserted through a check valve nipple 72 of any usual construction which is threadedly secured in the bottom of the bowl. When the chamber with the assembled die parts is ready to be filled with liquid the entire unit is inverted, this being before the unit is inserted on the bolster plate 11 and before it is put in the press. The nipple 72 is entirely removed and the parts are held in their normal or locked positions.

The liquid is then filled into the chamber through the nipple opening, air escaping therethrough as the filling takes place. When the chamber is completely filled with liquid running over, the nipple 72 is screwed home, entirely closing the chamber and preventing displacement of the liquid. The check valve is subsequently used from time to time to permit insertion of added charges of the liquid to maintain a full capacity within the chamber.

A strip of sheet material 75 may constitute the work being operated upon by the press mechanism and this strip is first positioned in the die where it rests on the upper surfaces of the rings 26, 31, 35, 41 and the upper surface of the anvil block 51 which are in the same horizontal plane as illustrated in Fig. 1.

The upper movable punch members which also constitute the actuating elements for the cutting and drawing operations, comprise a punch head 81 having a stem 82. This punch head moves up and down along a vertical axis in the usual and preferred manner, as in a press slide with which the stem is connected.

The punch head 81 is centrally recessed in a series of counterbores of different diameters, the larger recess being located adjacent the lower end and constituting a chamber 85. This chamber is enclosed by a cylindrical wall 86 which joins at its top with an annular inclined wall 87 leading into the second recess formed as a chamber 88. A cylindrical wall 89 encloses this chamber and joins with an inclined wall 91 above which leads into the third recess formed as a chamber 92. This chamber is enclosed by a cylindrical wall 93 and the upper end of the chamber communicates with a fourth recess or chamber 94 which is enclosed by a cylindrical wall 95, this being the smallest of the chambers.

A knockout pad 96 is located within the chamber 94 and is provided with an upwardly extending knockout rod or stem 97 normally held in raised position (Figs. 1 and 6) by a spring 98 surrounding the upper end of the stem and resting at its lower end within a counterbore 99 formed in the stem 82. An adjusting nut 101 and a locknut 102 threadedly engage the upper end of the stem and confine the spring 98 in operating position.

In operation the punch head 81 and the draw ring 26 constitute the proper instrumentalities for clamping the strip of sheet material 75 just prior to a disc being severed therefrom and, following this cutting action they provide the first slip grip on the edge of the disc while it is being drawn in the first drawing stage.

To bring these instrumentalities into action, the punch head 81 is lowered, the sheet material 75 being then clamped between the upper surface of the draw ring 26 and a lower face 105 of the head and the disc is cut out. Continued downward movement of the head from this point of engagement is resisted by the liquid 71 acting against the lower end of the draw ring 26 and the reaction resulting therefrom provides the proper clamping grip on the outer edge of the disc as the first drawing begins.

Figure 2:
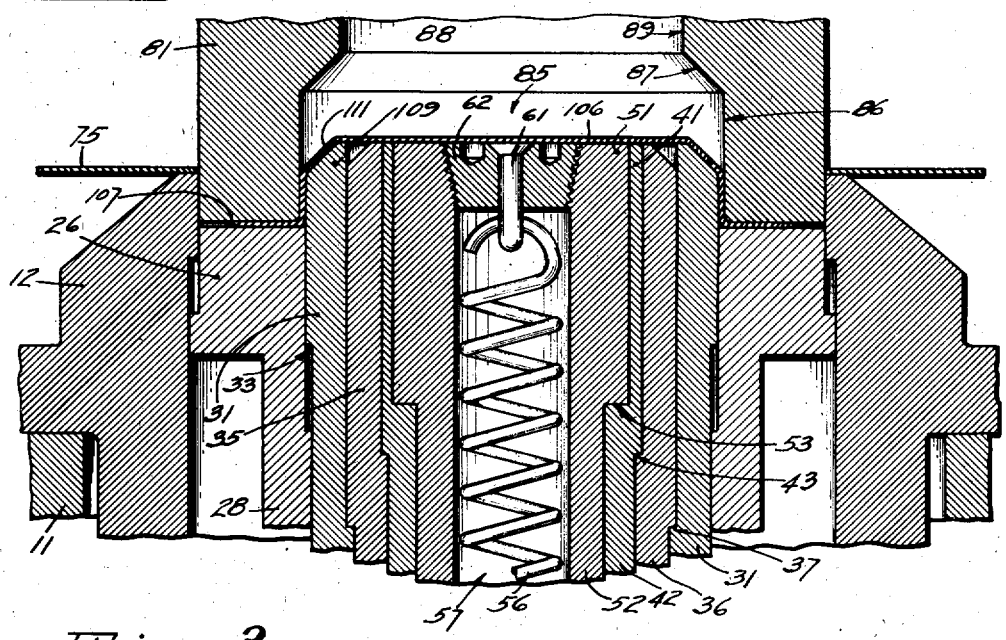
Figure 2 is an enlarged fragmentary sectional view of the mechanism illustrated in Figure 1, this view illustrating the parts in the position assumed during the first drawing stage following the cutting operation.

In this drawing operation, the draw ring 26 is forced down into the liquid which is non-compressible and this force is transmitted upwardly thereby against the bottom faces of the rings 31, 35, 41, and the block 51 forcing these parts upwardly and into the disc altering its shape by drawing it into a shell 106 (Fig. 2) having a flange 107. The flange 107 is the part engaged between the instrumentalities 81, 26, being gradually pulled out of the slip grip formed thereby. The central part of the shell is drawn over the anvil block 51 and over the draw rings 41, 35, 31, which are held locked together by their respective shouldered connections. The four parts all constitute anvil elements for this drawing stage.

It is the resistance against bending of the metal in the work being drawn which determines the amount of clamping action in the slip grip holding the edges of the work, the liquid acting merely as a freely flowing connection. Such resistance must be overcome to change the disc and draw it into shell form and this necessary force is applied by the descending punch head acting through the slip grip as soon as drawing takes place. The improved slip grip in this way is self-acting and self-compensating at all stages of drawing. This will be observed throughout the operations that follow.

The upper end of the draw ring 31 is tapered at its outer edge to provide a conical wall 109 and the shell 106 as it is being tightly drawn over the anvil elements in this stage of the first operation assumes the same shape adjacent the conical wall, as illustrated in the drawings being thus formed into a conical wall 111.

Downward movement of the head 81 with the corresponding upward movement of the anvil parts continues until the entire flange 107 is drawn off and there then results a shell 112 (Fig. 3) having a cylindrical wall 113 located exterior of the outer wall of and resting on the upper part of the draw ring 31 being inside of the wall 86 of the chamber 85. The diameters of these walls are dimensioned to accommodate the normal metal thickness of this cylindrical wall 113 of the shell 112.

During this drawing stroke the ring 31 with the other anvil elements has been lifted until the conical wall 111 of the shell 112 is brought into engagement with the wall 87 of the punch head. This wall of the shell 112 is thus tightly held between the punch head 81 and the ring 31 and the shell and the die parts are ready for the second stage of the drawing operation which immediately follows.

In this second stage of drawing, the walls 109, 87 of the respective parts 31, 81 constitute the instrumentalities for clamping the shell 112 in a slip grip, effective at its inclined wall 111, while the shell is drawn up into the chamber 88. The ring 31 ceases to be an anvil and becomes a draw ring. The active moving member is still the head 81 but with it now travels downwardly the draw rings 26 and 31 which push down into the liquid displacing it and causing a corresponding upward movement of the rings 35, 41 and the anvil block 51, all of these now being anvil elements, the upper faces of these members being still maintained in a horizontal plane as they are bodily lifted.

Figure 3:
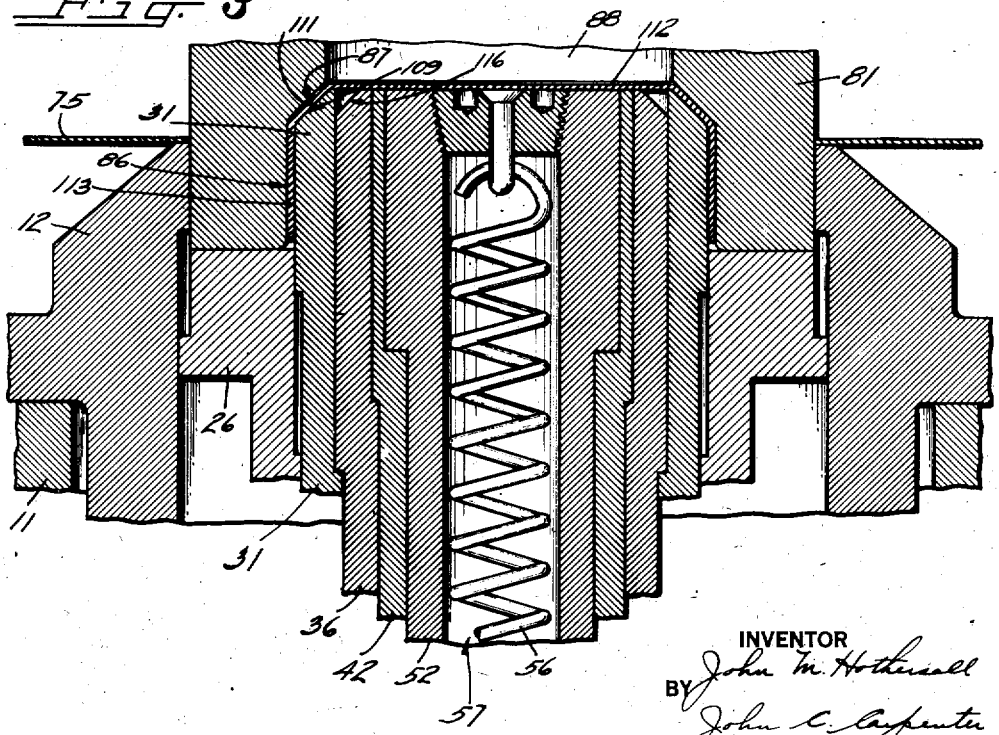
Figure 3 is a view similar to Fig. 2 illustrating the second drawing stage.
Figure 4:
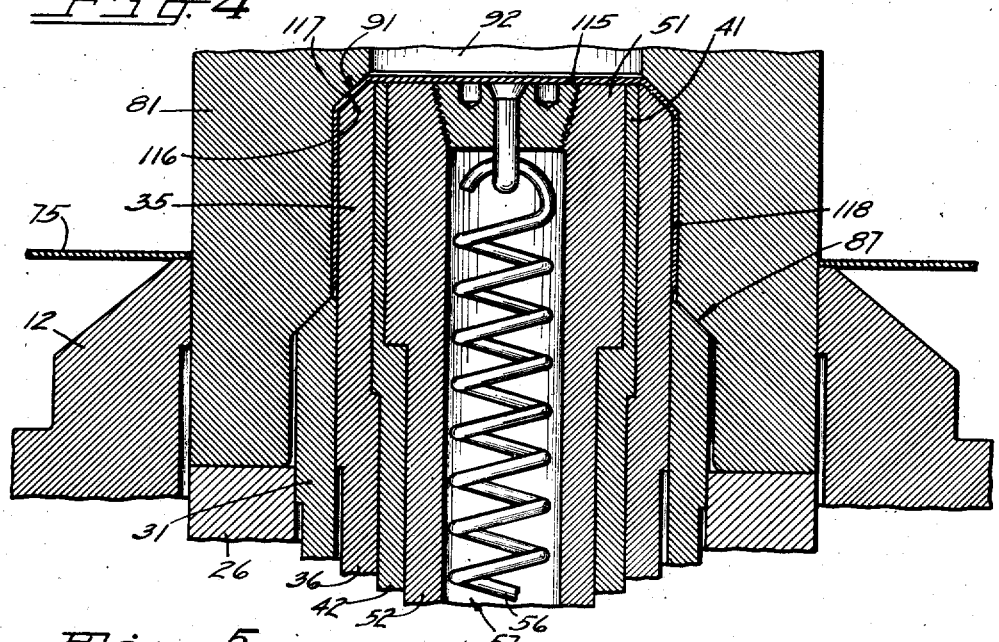
Figure 4 is a view similar to Fig. 2 illustrating the third drawing stage.

The wall 113 thus slips through the slip grip passage between the walls 87 and 109, the shell 112 being altered in shape as it is drawn from the position illustrated in Fig. 3 into the position illustrated in Fig. 4, this view showing the completion of the second drawing operation. A shell 115 is thus produced.

The upper end of the ring 35 adjacent its outer edge is formed as a conical wall 116 and it is over this wall that the metal of the shell is formed to produce a wall 117. The uppermost position of the draw ring 35 and the other anvil parts at the end of the second drawing stage brings the conical surface 116 so that it clamps the wall 117 of the shell 115 tightly against the wall 91, the shell being fully within the chamber 88 and a cylindrical wall 118 being formed. The draw ring 35 is thus in position to provide a clamping instrumentality for the next succeeding or third stage of drawing operation.

Figure 5:
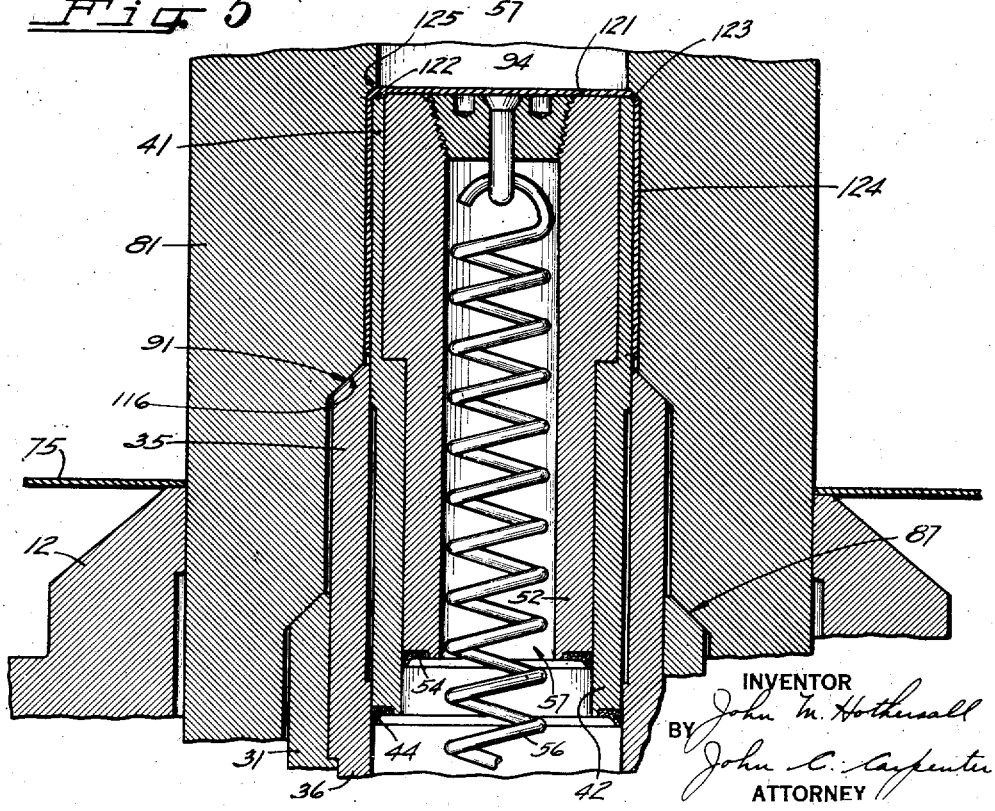
Figure 5 is a view similar to Fig. 2 illustrating the 4th drawing stage.

During the third drawing stage the ring 35 ceases to act as an anvil element and functions as a draw ring while the shell 115 is further reduced in diameter and altered in shape by movement of the parts from the position illustrated in Fig. 4, to that illustrated in Fig. 5. The latter view shows the relation of the die parts at the completion of the third drawing operation and shows a shell 121 formed thereby.

For this drawing of the shell the head 81 and draw rings 26, 31 and 35 are moved downwardly, this force reacting through the liquid 71 to lift the draw ring 41 and the anvil block 51, these parts constituting the anvil elements. The walls 117 and 118 of the shell 115 are drawn through the proper slip grip afforded by the walls 116, 91 during the formation of the shell 121. Such a shell is drawn over an upper rounded edge 122 formed in the ring 41 and is, therefore, formed with a rounded corner 123 which extends into a cylindrical wall 124.

At the completion of this drawing stage, the upper rounded edge 122 has brought the rounded corner 123 of the shell 121 into engagement with an annular groove 125 formed at the junction of the walls 93, 95 of the chambers 92, 94 and the parts are in position for the next stage of drawing operation. These walls 122, 125 now provide the necessary slip grip, the ring 41 and head 81 constituting instrumentalities for this clamping of the metal in the slip grip.

In the final drawing operation which immediately follows, the shell 121 is further reduced and altered in shape to provide a cup member 131

(Fig. 6) having a cylindrical wall 132 and an offset wall 134 which is of the same diameter as the diameter of the wall 124 of the shell 121, being in fact a remnant of that wall not drawn through the slip grip.

In such a final drawing movement the draw rings 26, 31, 35, 41 move with the head 81, the anvil function being solely performed by the anvil block 51. Again, it is the downward movement of the draw ring parts and their pressure against the liquid 71 that reacts as a lifting force on the anvil block 51. The cup member 131 is now completely formed, its upper wall being in contact with the knockout pad 96. Fig. 6 shows the position of the parts at the completion of the drawing operations.

It will be understood that the four distinct drawing operations which have been separately disclosed in the drawings follow one another without any interruption and during a single downward movement of the punch head. Four operations are here given as an example of what can be done but variations may be made upon the number of rings provided. It will also be observed that the anvil block 51 constantly rises. At such time the spring 56 is extended further and further until it reaches its finally expanded position as disclosed in Fig. 6, when the completely drawn article or cup member 131 is produced.

Upon the ascent of the die 81 the spring 56 pulling down upon the anvil 51 through the hydraulic medium returns all of the parts to their normal position in readiness for the drawing of the next succeeding disc to be cut from the sheet.

It will be understood that the spring 56 is sufficiently strong to restore these parts to their locked positions while the draw ring 26 follows up with the rising head 81. At the time the surface 105 of the punch head 81 leaves the upper surface of the draw ring 26, the parts 26, 31, 35, 41 and 51 have reached their normal lowered positions, as illustrated in Fig. 1.

During this restoring of the parts to normal position and during the downward movement of the anvil block 51, the drawn cup member 131 remains in the chamber 94. As the punch head 81 nears the upward end of its travel, this being after the head is above and clear of the lower die mechanism, the upper end of the rod 97 is engaged by any suitable stationary part on the machine. The pad 96 being thus held against further movement, with the head 81 continually rising, the upper wall of the chamber 94 moves away from the pad 96 until the pad is at the lower end of the chamber. The cup member 131 is in this way stripped or ejected from the chamber 94 and falls through the other chambers and out of the head 81.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

Claims 16 to 28 inclusive hereof were held allowable to me in my copending application Serial No. 452,852, filed May 16, 1930, constituting claims 1 to 8 inclusive, 25, 29, 30, 31 and 32 in said application, and are made in this reissue application to preserve the line of division between the claims of this reissue application and the claims of the aforesaid copending application, the above mentioned claims 16 to 28 inclusive relating to the same subject matter as claim 15 of this application.

I claim:

1. The art of drawing metal, which comprises drawing sheet material over a plurality of nested anvil elements while holding its outer edges in a succession of slip grips having their clamping pressures hydraulically transmitted by drawing resistance on said anvils and pulling the innermost anvil elements in a direction opposite to said pressures.

2. The art of drawing metal, which comprises drawing sheet material in stages over a plurality of concentric anvil elements while holding its outer edges at each stage in hydraulic self-compensating slip grips, a said anvil element of one drawing stage providing a slip grip for the next succeeding stage at the same time pulling the innermost anvil element in a direction opposite to the hydraulic gripping.

3. The art of drawing metal, which comprises drawing sheet material in a series of drawing operations over a plurality of anvils formed of nested anvil elements by utilizing a different size of anvil for each stage of operation beginning with the larger anvil made up of the greatest number of elements while holding the outer edges of the material at each stage in a slip grip having its clamping pressure hydraulically transmitted thereto by the anvil in use, and pulling said anvils successively one by the other in a direction opposite to said clamping pressures.

4. The art of drawing metal, which comprises drawing sheet material in a series of drawing operations by successively drawing the material over one of a plurality of nested anvil elements while holding the outer edge of the material at each stage in a slip grip, a part of the anvil of one stage becoming an element in the slip grip for the next succeeding stage, the clamping pressure of each slip grip being hydraulically transmitted thereto by the anvil in use, and pulling said anvils successively one by the other in a direction opposite to said clamping pressures.

5. In a drawing press mechanism, the combination of punch head and a plurality of pairs of opposed substantially concentric inner and outer instrumentalities clamping material to be drawn in successive slip grips, a plurality of anvils over which the material is drawn in stages as it is successively removed from its slip grips, means for moving said instrumentalities to effect the drawing of said material, and hydraulic connecting means in which the lower parts of the anvils are directly immersed, and operating between said anvils and one of each pair of said instrumentalities whereby movement of the latter is transmitted through the liquid to said anvils causing them to move in an opposing direction, hydraulic means being closed to external pressure and the operative hydraulic pressure on the inner instrumentalities being caused by the contrary movement of an outer said instrumentality.

6. In a drawing press mechanism, the combination of a plurality of die members located concentrically of each other, an actuating punch member adapted to progressively clamp the edges of a sheet material disc being drawn against said die members during a single working stroke to form a slip grip at each engagement, and hydraulic means for transmitting the moving force of said actuating punch member to said die members to move them in an opposite direction and to force the central part of said disc through said slip grips and draw it into shell form, shoulders formed on said die members, and a spring drawing the inner die member in a direction away from said punch member.

7. In a drawing press mechanism, the combination of a plurality of die members located concentrically of each other, an actuating punch member adapted to progressively clamp the edges of a sheet material disc being drawn against said die members during a single working stroke to form a slip grip at each engagement, and hydraulic means for transmitting the moving force of said actuating punch member to said die members to move them in an opposite direction and to force the central part of said disc through said slip grips and draw it into shell form, said punch member preventing an opposite movement of a said die member after it ceases to function as a slip grip, shoulders formed on said die members, and a spring drawing the inner die member in a direction away from said punch member.

8. In a drawing press mechanism, the combination of a plurality of die members located concentrically of each other and having shoulders whereby each inner die member holds each outer die member from individual upward movement, an actuating punch member adapted to progressively clamp the edges of a sheet material disc being drawn against said die members during a single working stroke to form a slip grip at each engagement, hydraulic means for transmitting the moving force of said actuating punch member to said die members to move them in an opposite direction and to force the central part of said disc through said slip grips and draw it into shell form, and devices including a spring connected with the innermost die member for restoring said die parts to normal position when disengaged by said punch member.

9. A drawing press mechanism comprising, in combination a plurality of die members located one within the other and having sliding movement therebetween, an actuating punch member having movement toward said die members and adapted to perform a succession of drawing operations during its working stroke by first engaging the edges of a disc of sheet material and clamping it against the outer of said dies in a slip grip forcing the said die downwardly while drawing said disc into shell form over the other inner dies and withdrawing its said edges from said slip grip and then further engaging in succession the other of said die members and forming other slip grips while progressively drawing the said shell into smaller form over the remaining inner die members, and hydraulic means in which the lower part of each die member is directly immersed for transmitting the force of movement of each engaged die member to the other non-engaged die members forcing them upwardly against the work to produce the said shell forms.

10. In a drawing press mechanism, the combination of a plurality of die members located concentrically of each other, an actuating punch member adapted to progressively clamp the edges of a sheet material disc being drawn against said die members during a single working stroke to form a slip grip at each engagement, and hydraulic means closed to external hydraulic pressure for transmitting the moving force of said actuating punch member to said die members to move them in an opposite direction and to force the central part of said disc through said slip grips and draw it into shell form.

11. The combination of a punch, an opposed cutting and gripping die, inner drawing dies concentric within said cutting die, and a bowl filled with a fluid in which the lower ends of said dies are immersed, said bowl being closed to external hydraulic pressure.

12. The art of drawing metal, which comprises drawing sheet material in stages over outer and inner anvil elements while holding its outer edges in hydraulic self-compensating slip grips, a said anvil element of one drawing stage providing a slip grip for the next succeeding stage, such clamping pressure of each slip grip at any given stage in the drawing operation being determined by the resistance against bending of the material on the anvil in use, by transmitting the initial die pressure to a confined body of practically non-compressible fluid and causing said fluid to be displaced by an outer die element so as to propel and give drawing movement to an inner die element.

13. The art of drawing sheet metal to elongated cup formation, which consists in drawing the metal successively to cup-shapes of decreasing diameter, by causing an outer die element to displace a practically non-compressible fluid in a single confined body of the same, so that the displaced fluid propels and gives drawing movement to an inner die element.

14. The art of drawing sheet metal to cup formation, which consists in drawing it successively to cup shapes of decreasing diameter, the while maintaining an hydraulic pressure on the drawing elements and on the material in amount proportionate to the resistance said material progressively reposes to the drawing, by causing an outer die element to displace a substantially non-compressible fluid in a single confined body of the same, so that the displaced fluid propels and gives drawing movement to an inner die element.

15. The art of drawing sheet metal to cup formation, which consists in applying pressure to the sheet metal and thereby gripping the metal against an outer gripping element, and causing the movement of the outer gripping element, and thereby displacing a confined practically non-compressible fluid, and causing said displaced fluid to apply drawing pressure in an opposite direction to an inner die or dies.

16. In a drawing press mechanism, the combination, with cutting parts, of a pair of opposed substantially concentric instrumentalities clamping material to be drawn in a slip grip, an anvil over which the material is drawn as it is removed from its slip grip, means for moving said instrumentalities to effect the drawing of said material and hydraulic connecting and pressure-transmitting means between said anvil and a said gripping instrumentality whereby movement of the latter is transmitted through the liquid to said anvil causing it to move in an opposing direction.

17. In a drawing press mechanism, the combination, with cutting parts, of a pair of opposed substantially concentric instrumentalities clamping material to be drawn in a slip grip, a stationary cutting die positioned concentric thereto and cooperating with one of said instrumentalities to cut a disc from said strip, an anvil over which the disc is drawn as it is removed from its slip grip, means for moving said instrumentalities to effect the cutting and drawing actions and hydraulic connecting means between said anvil and a said instrumentality and operating throughout the cutting and the drawing operations to transmit the movement of said instrumentality to said anvil causing it to move in an opposing direction.

18. In a drawing press mechanism, the combination, with cutting parts, of a pair of opposed, substantially concentric instrumentalities clamping material to be drawn in a slip grip, an anvil over which said material is drawn, and an hydraulic device embodying a cylinder and piston members movable therein, said members moving with said anvil and with a said instrumentality and confining a liquid therebetween whereby the movement of one of said pistons is transmitted through the liquid to the other.

19. A compensating hydraulic device for a drawing press mechanism comprising in combination, with cutting parts, of a pair of opposed substantially concentric instrumentalities for clamping material in a slip grip while performing a drawing operation thereon, an anvil over which said material is drawn, and means acting during the drawing operation for exerting a clamping pressure on said material in said slip grip in direct proportion to the drawing resistance offered by the material being drawn.

20. A compensating hydraulic device for a drawing press mechanism comprising in combination, with cutting parts, of a pair of opposed substantially concentric instrumentalities for clamping material in a slip grip while performing a drawing operation thereon, an anvil over which said material is drawn, means acting during the drawing operation for exerting a clamping pressure on said material in said slip grip in direct proportion to the drawing resistance offered by the material being drawn, and devices for returning the parts to normal position after the drawing operation.

21. In a drawing press mechanism, the combination, with cutting parts, of a pair of opposed, substantially concentric instrumentalities clamping material to be drawn in a slip grip, an anvil over which said material is drawn, an hydraulic unit interposed between said anvil and a said instrumentality for transmitting pressure from one to the other as such pressure is developed by the drawing resistance in said material, said pressure being manifested as a clamping pressure in said slip grip and bearing a predetermined relation to said drawing resistance.

22. In a drawing press mechanism, the combination, with cutting parts, of a pair of opposed, substantially concentric instrumentalities clamping material to be drawn in a slip grip, an anvil over which said material is drawn, an hydraulic unit interposed between said anvil and a said instrumentality for transmitting pressure from one to the other during the drawing operation, and means for removably connecting said anvil with said hydraulic unit.

23. In a drawing press mechanism, the combination, with cutting parts, of a pair of opposed, substantially concentric instrumentalities clamping the work therebetween in a slip grip, an anvil over which said work is drawn as it is removed from its slip grip, an hydraulic unit interposed between said anvil and a said instrumentality, said unit comprising a cylinder, an outer piston member movable therein and an inner piston member movable within said outer member, said members confining the liquid of said unit therebetween, and means associated with said instrumentalities for moving said outer piston and through said liquid correspondingly moving said inner piston, said movements being in opposite directions of travel and operating against the material being drawn to establish clamping pressure in said slip grip.

24. In a sheet metal press, the combination of a fixed die, a chamber having a liquid therein, oppositely movable ring and block elements cooperating with said die, means movable with said ring and disposed in the liquid, means rigid with said block and also disposed in the liquid, and a movable die for urging said ring in one direction, whereby to move said block in the opposite direction.

25. A method for shaping articles from metal blanks which consists in placing a blank to be shaped over a die and supporting said blank upon a blank holder positioned in the path of a second die arranged to move toward the first die, so that upon movement of the second die to effect drawing of the blank the latter will be clamped between the blank holder and the second die by a pressure which bears a constant ratio to the drawing pressure.

26. A method for shaping metal blanks which consists in drawing the blank to be shaped between cooperating dies by hydraulic means, clamping a portion of the blank against only one of the dies by hydraulic means, and maintaining a free and direct interflow of pressure fluid between the hydraulic drawing means and the hydraulic clamping means, whereby to transmit pressure therebetween in substantially undiminished condition, said interflow of pressure fluid serving to clamp said blank during the drawing operation by a pressure which bears a constant ratio to the drawing pressure.

27. The art of forming articles, which comprises, drawing sheet material over an anvil while holding its outer edges in a slip grip and hydraulically transmitting the resulting clamping pressure to said anvil, said clamping pressure being substantially determined at any given drawing time by the drawing resistance offered by the sheet material.

28. The art of forming articles, which comprises, drawing sheet material over an anvil while holding its outer marginal edge in a slip grip and hydraulically transmitting the resulting clamping pressure to said anvil, said clamping pressure bearing at all times a constant ratio to the drawing resistance.

JOHN M. HOTHERSALL.